(12) United States Patent
Goto

(10) Patent No.: US 11,810,323 B2
(45) Date of Patent: Nov. 7, 2023

(54) POSITION ESTIMATION SYSTEM

(71) Applicant: NTT DOCOMO, INC., Chiyoda-ku (JP)

(72) Inventor: Osamu Goto, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 443 days.

(21) Appl. No.: 17/283,825

(22) PCT Filed: Oct. 1, 2019

(86) PCT No.: PCT/JP2019/038824
§ 371 (c)(1),
(2) Date: Apr. 8, 2021

(87) PCT Pub. No.: WO2020/137069
PCT Pub. Date: Jul. 2, 2020

(65) Prior Publication Data
US 2021/0343036 A1    Nov. 4, 2021

(30) Foreign Application Priority Data

Dec. 28, 2018  (JP) ................... 2018-246884

(51) Int. Cl.
*G06T 7/70*       (2017.01)
*G06T 7/73*       (2017.01)
(Continued)

(52) U.S. Cl.
CPC .................. *G06T 7/74* (2017.01); *G06T 3/40* (2013.01); *G06T 7/207* (2017.01); *G06T 7/70* (2017.01);
(Continued)

(58) Field of Classification Search
CPC .. G06T 7/74; G06T 7/207; G06T 7/70; G06T 3/40; G06T 2207/20132; G06T 2207/30244; G06T 7/73; G06V 20/10
See application file for complete search history.

(56) References Cited

U.S. PATENT DOCUMENTS 7,305,149 B2 * 12/2007 Yoshikawa ............... G06T 7/74
                                                         382/103
8,897,541 B2 * 11/2014 Weisenburger ........... G06T 7/73
                                                         382/113
(Continued)

FOREIGN PATENT DOCUMENTS

EP        2851880 B1 * 10/2019 ............... G01V 8/20
JP        2012-54754 A    3/2012
(Continued)

OTHER PUBLICATIONS

International Search Report dated Nov. 5, 2019 in PCT/JP2019/038824 filed on Oct. 1, 2019, 1 page.
(Continued)

*Primary Examiner* — Manav Seth
(74) *Attorney, Agent, or Firm* — Oblon, McClelland, Maier & Neustadt, L.L.P.

(57)  ABSTRACT

A position estimation system includes: a reference image database configured to store a reference image and information indicating a position in a state in which they are associated with each other; an acquisition unit configured to acquire an image for estimation which is a position estimation target; an estimation unit which performs comparison of the reference image with the image for estimation, estimate the position related to the image for estimation from the information indicating the position associated with the reference image, and calculate a reliability of the estimated position; and an update unit configured to update the refer-
(Continued)

ence image using the image for estimation on the basis of the reliability.

10 Claims, 13 Drawing Sheets

(51) Int. Cl.
  *G06T 7/207* (2017.01)
  *G06T 3/40* (2006.01)
  *G06V 20/10* (2022.01)
(52) U.S. Cl.
  CPC .... *G06V 20/10* (2022.01); *G06T 2207/20132* (2013.01); *G06T 2207/30244* (2013.01)

(56) References Cited

U.S. PATENT DOCUMENTS

| | | | | |
|---|---|---|---|---|
| 8,942,483 | B2 * | 1/2015 | Janky | G06T 7/74 |
| | | | | 382/113 |
| 9,881,377 | B2 * | 1/2018 | Mika | G06T 7/80 |
| 10,600,202 | B2 * | 3/2020 | Ikeda | G06T 7/74 |
| 10,636,165 | B2 * | 4/2020 | Moteki | G06T 7/174 |
| 11,010,977 | B2 * | 5/2021 | Stauber | G06T 19/006 |
| 11,062,475 | B2 * | 7/2021 | Nakashima | G06N 3/08 |
| 2003/0169903 | A1 * | 9/2003 | Yoshikawa | G01C 21/26 |
| | | | | 382/106 |
| 2013/0033603 | A1 * | 2/2013 | Suzuki | G08G 1/096775 |
| | | | | 348/148 |
| 2018/0253861 | A1 * | 9/2018 | Moteki | G06T 7/174 |
| 2019/0362517 | A1 * | 11/2019 | Miyamoto | H04W 64/003 |
| 2020/0013188 | A1 * | 1/2020 | Nakashima | G06N 3/045 |
| 2021/0343036 | A1 * | 11/2021 | Goto | G06T 7/70 |

FOREIGN PATENT DOCUMENTS

| | | | | |
|---|---|---|---|---|
| JP | 2017187861 A | * | 10/2017 | G01S 3/00 |
| NL | 2016718 B1 | * | 11/2017 | B60R 1/00 |
| WO | WO-2014020108 A1 | * | 2/2014 | G06T 7/73 |
| WO | WO-2015169338 A1 | * | 11/2015 | G01C 11/02 |
| WO | WO-2023084945 A1 | * | 5/2023 | |

OTHER PUBLICATIONS

International Preliminary Report on Patentability and Written Opinion of the International Searching Authority dated Jul. 8, 2021 in PCT/JP2019/038824 (submitting English translation only), 6 pages.

\* cited by examiner

POSITION ESTIMATION SYSTEM

TECHNICAL FIELD

The present invention relates to a position estimation system for estimating a position on the basis of an image.

BACKGROUND ART

Conventionally, there has been proposed a technique of estimating, from a captured image obtained by capturing (photographing), a position at which the captured image is captured, (for example, see Patent Literature 1). For example, reference images associated with positions are prepared in advance, a captured image is compared with the reference images, and a position is estimated from the position associated with the reference image similar to the captured image.

Preparation of a reference image and information indicating a position associated with the reference image is performed, for example, by acquiring an image by capturing and positioning using a Global Positioning System (GPS) or the like at a position at which the image is captured, as shown in Patent Literature 1.

CITATION LIST

Patent Literature

[Patent Literature 1] Japanese Unexamined Patent Publication No. 2012-54754

SUMMARY OF INVENTION

Technical Problem

In a position estimation based on an image as described above, when a scenery (landscape) changes due to construction or the like, a reference image captured in the past differs from a user image which is a captured image as an estimation target even at the same position, and thus an accurate position may not be estimated. For that reason, it is desirable that the reference image reflects the current scenery. However, as described above, updating the reference image by capturing and positioning requires a great deal of trouble.

One embodiment of the present invention has been made in view of the above, and an object of the present invention is to provide a position estimation system in which updating a reference image in estimating a position using an image can be easily and appropriately performed.

Solution to Problem

In order to achieve the above object, a position estimation system according to an embodiment of the present invention includes: a reference image database configured to store a reference image and information indicating a position in a state in which the reference image and the information are associated with each other; an acquisition unit configured to acquire an image for estimation which is a position estimation target; an estimation unit configured to perform comparison of the reference image stored in the reference image database with the image for estimation acquired by the acquisition unit, estimate the position related to the image for estimation from the information indicating the position associated with the reference image, and calculate a reliability of the estimated position; and an update unit configured to update the reference image stored in the reference image database using the image for estimation on the basis of the reliability calculated by the estimation unit.

In the position estimation system according to the embodiment of the present invention, since the reference image is updated using the image for estimation, there is no need to perform capturing and positioning only to register the reference image. Further, in the position estimation system according to the embodiment of the present invention, since the reference image is updated on the basis of the reliability, an appropriate update is performed. Therefore, according to the position estimation system according to the embodiment of the present invention, it is possible to easily and appropriately update the reference image in estimating the position using the image.

Advantageous Effects of Invention

In one embodiment of the present invention, since the reference image is updated using the image for estimation, there is no need to perform capturing and positioning only to register the reference image. Further, in the embodiment of the present invention, since the reference image is updated on the basis of the reliability, an appropriate update is performed. Therefore, according to the embodiment of the present invention, it is possible to easily and appropriately update the reference image in estimating the position using the image.

DESCRIPTION OF EMBODIMENT

Hereinafter, embodiments of a position estimation system according to the present invention will be described in detail with reference to the drawings. Also, in the description of the drawings, the same elements are denoted by the same reference signs, and repeated descriptions thereof will be omitted.

Figure 1:
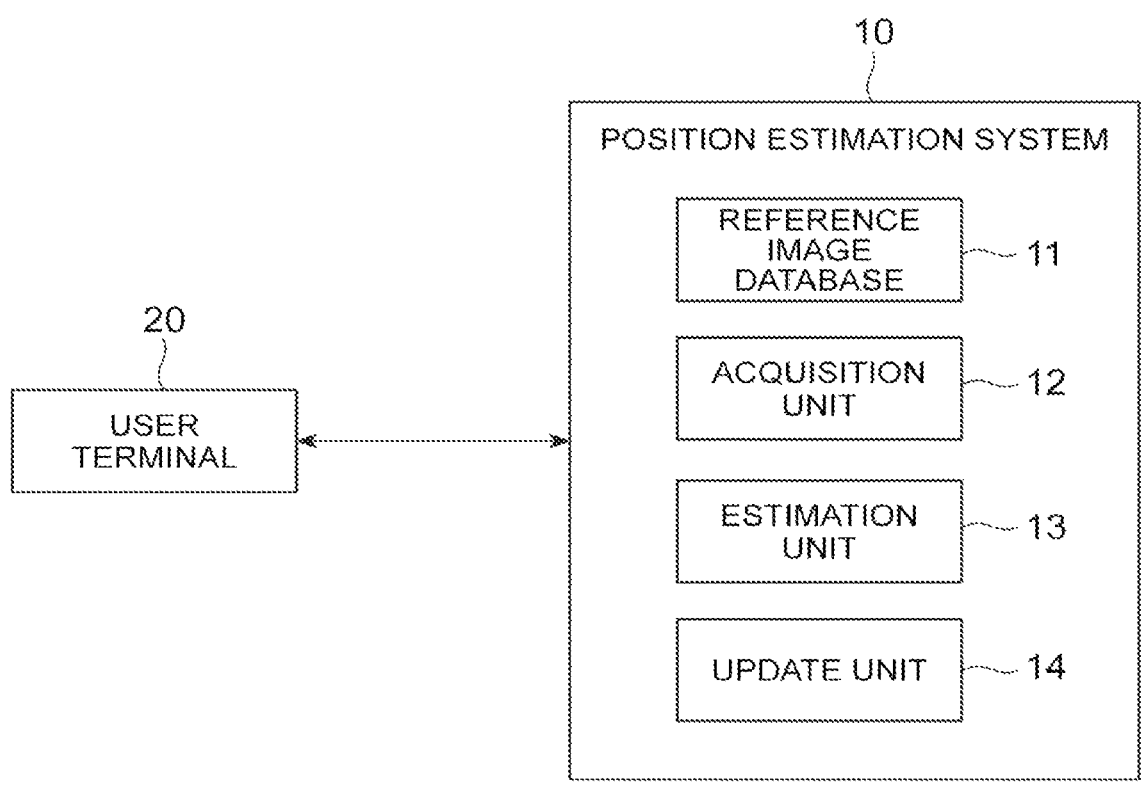
FIG. 1 is a diagram showing a configuration of a position estimation system according to an embodiment of the present invention.

FIG. 1 shows a position estimation system 10 according to the present embodiment. The position estimation system 10 is a system for estimating a position on the basis of an image (image data). Specifically, the position estimation system 10 estimates a position of a user terminal 20, specifically, a position at which a user image is captured (a user position) on the basis of the user image captured by the user terminal 20. In addition, the position estimation system 10 may estimate a direction (a point of the compass) in which the user image is captured, together with the estimation of the position.

The user terminal 20 is held (carried) by a user for use. The user terminal 20 is, for example, a mobile phone, a smartphone, or a tablet terminal. The user terminal 20 includes a camera that is a capturing device and that can acquire the user image by capturing. In addition, the user terminal 20 has a communication function such as a mobile communication function. The position estimation system 10 and the user terminal 20 can transmit and receive information to and from each other via a communication network such as a mobile communication network.

When estimating the position of the user terminal 20 itself, the user terminal 20 captures surrounding scenery with the camera included in the user terminal 20 itself and transmits the user image obtained by the capturing to the position estimation system 10.

The position estimation system 10 is realized by, for example, a server device. Also, the position estimation system 10 may be realized by a plurality of server devices, that is, a computer system.

Subsequently, functions of the position estimation system 10 according to the present embodiment will be described. As illustrated in FIG. 1, the position estimation system 10 includes a reference image database 11, an acquisition unit 12, an estimation unit 13, and an update unit 14.

The reference image database 11 is a database in which reference images and information indicating positions are stored in a state in which they are associated with each other. The reference image is an image stored in advance in the position estimation system 10 used for position estimation based on the image. The position indicated by the information associated with the reference image is a position at which the reference image is captured. In the present embodiment, the position estimation based on the image is performed on the basis of the concept that, if the reference image is compared with an image for estimation which is a target of the position estimation and they are the same image, the position indicated by the information associated with the reference image is determined as an estimated position.

The information indicating the position associated with the reference image is, for example, latitude and longitude of the position. However, other information may be used as the information indicating the position. The reference image database 11 stores a plurality of reference images. The reference image database 11 may store the plurality of reference images associated with information indicating various positions so that appropriate position estimation can be performed.

Further, the reference image database 11 may store information indicating a direction associated with each reference image. The direction is a direction in which the reference image is captured. By storing the information indicating the direction, the position estimation system 10 can estimate the direction in addition to the position with respect to the image for estimation.

The reference images stored in the reference image database 11 and information related to the reference images are generated by capturing images at positions associated with the reference images, positioning using GPS or the like at the positions, and the like. Further, the reference images stored in the reference image database 11 are updated using user images, which will be described later.

The acquisition unit 12 is a functional unit that acquires the image for estimation which is the target of the position estimation. Specifically, the acquisition unit 12 receives and acquires the user image transmitted from the user terminal 20 as the image for estimation. The acquisition unit 12 may acquire a plurality of user images. When the plurality of user images are acquired, the acquisition unit 12 may acquire information indicating times related to the user images. The times related to the user images are, for example, times when capture of the user images is performed or times when the user images are received by the acquisition unit 12. When the information indicating the times at which capture of the user images is performed is acquired, for example, the user terminal 20 transmits the information indicating the times together with the user images to the position estimation system 10, and the acquisition unit 12 receives the information together with the user images. The acquisition unit 12 outputs the acquired user images and information to the estimation unit 13 and the update unit 14.

The estimation unit 13 is a functional unit which compares the reference images stored in the reference image database 11 with the user image acquired by the acquisition unit 12, estimates a position related to the user image from the information indicating the positions associated with the reference images, and calculates a reliability of the estimated position. The estimation unit 13 may compare each of the plurality of reference images with the user image, calculate similarity between each of the reference images and the user image, and calculate the reliability of the estimated position on the basis of the calculated similarity. The estimation unit 13 may use a plurality of methods to estimate a position of the user image according to each method and calculate the reliability on the basis of the position according to each method. The estimation unit 13 may perform image processing on the user image to generate a plurality of patterns of user images, estimate the position of the user image according to each pattern, and calculate the reliability on the basis of the position according to each pattern. When a plurality of user images are acquired by the acquisition unit 12, the estimation unit 13 calculates the reliability for each user image.

Specifically, the estimation unit 13 estimates the position related to the user image as follows. The estimated position related to the user image is the position at which the user image is captured as described above. The user image is input to the estimation unit 13 from the acquisition unit 12. In addition, the estimation unit 13 reads the reference images from the reference image database 11. The estimation unit 13 calculates the similarity by comparing the user image with the reference images. The estimation unit 13 calculates the similarity with, for example, a value of 0% to 100%. The estimation unit 13 calculates the similarity between the user image and each reference image.

For calculating the similarity, a method can be used in which, using a method called Scale Invariant Feature Transform (SIFT), feature points or feature amounts of both images are extracted or contours and edges of both images are extracted and matching of the feature points or contours are performed, thereby calculating the similarity. Alternatively, the similarity may be calculated by comparing color histograms. Alternatively, the similarity may be calculated by using a deep learning technique based on neural networks.

In the case in which the similarity between the reference image and the user image is 100% for only one reference image, that is, the reference image and the user image match 100%, the estimation unit 13 estimates the position indicated by the information which is stored in the reference image database 11 while associated with the reference image, that is, the position of the reference image, as the position related to the user image.

However, the match of 100% is rarely found, and in many cases, similarities exceeding 0% are calculated for a plurality of reference images. In this case, the estimation unit 13 may estimate the position of the reference image having the highest similarity as the position related to the user image. Alternatively, the estimation unit 13 may normalize the similarities such that a sum of similarities becomes 100% for a plurality of reference images for each of which a similarity exceeding 0% is calculated, and estimate the position of a center of gravity obtained by weighting positions of the reference images by the normalized similarities as the position related to the user image.

Further, the estimation unit 13 may use a plurality of different methods as described below to estimate the position of the user image according to each method. The estimation unit 13 calculates the similarity between the reference image and the user image using a plurality of different methods described above and performs the position estimation according to each method as described above. The method for calculating the similarity is stored in the estimation unit 13 in advance. The estimation unit 13 calculates the center of gravity of the estimated position according to each method and estimates the position of the center of gravity as the position related to the user image.

Also, the estimation unit 13 may perform processing of image (image processing) on the user image to generate a plurality of patterns of user images and estimate the position of the user image for each pattern. Examples of the processing of image include a change in brightness, a change in contrast, processing of masking a part of an image or adding noises thereto, or the like. The estimation unit 13 performs each instance of image processing on the user image to generate the plurality of patterns of user images. The type of processing to be performed is stored in the estimation unit 13 in advance. The plurality of patterns of user images may be generated by varying a degree of change for one type of processing method, or the plurality of patterns of user images may be generated by a plurality of processing methods different from each other. The estimation unit 13 calculates the similarity between each of the plurality of patterns of the user images and the reference image and performs position estimation for each of the patterns as described above. The estimation unit 13 calculates the center of gravity of the position estimated for each pattern and estimates the position of the center of gravity as the position related to the user image.

The estimation of the position related to the user image based on the plurality of methods and the plurality of patterns of user images described above is useful for calculating the reliability of the estimated position, which will be described later. That is, if a variation of the plurality of positions used for estimating the position related to the user image is smaller, the estimated position can be regarded as solid and high in accuracy.

The estimation unit 13 calculates the reliability of the estimated position. The reliability is an index indicating certainty of the position estimation. Specifically, the estimation unit 13 calculates the reliability as described below. When a similarity between a reference image and a user image has a value exceeding 0% for only one reference image, the estimation unit 13 uses the similarity as the reliability. When similarities exceeding 0% are calculated for a plurality of reference images, the estimation unit 13 calculates the reliability based on how close a total value of the calculated (unnormalized) similarities is to 1 (100%). For example, when the (unnormalized) similarities for the reference images A, B, and C are calculated to be 40%, 30%, and 30%, respectively, that is, when the sum of the similarities becomes 100%, the position of the center of gravity can be estimated to be extremely close to the true position, and accordingly, the reliability is set to 100% (=100/100). When the total value of the similarities is smaller than 100%, the reliability is set to the total value of the similarities.

When the total value of the similarities is larger than 100%, a value obtained by dividing 100 by the total value of the similarities is set to be the reliability. For example, when the total value of the similarities is 200%, 100/200=50%, and 50% is set to be the reliability. When the total value of the similarities exceeds 100%, it is considered that the more the value exceeds 100%, the less reliability the calculated value of the similarities has, and thus the estimated position is also regarded as having a less reliability.

The calculation of the reliability (particularly when the total value of the similarities exceeds 100%) is based on the premise that the positions of the reference images are not too dense. In the case in which the positions of the reference images are too dense and there are positions of a plurality of reference images very close to a certain position, the similarity calculated between the user image captured near the position of each reference image and each reference image has a value close to 100%, and therefore the total value of the similarities exceeds 100%. On the other hand, since the position estimated in this case is obtained by capturing the image near the positions of the reference images, the position of the user image estimated using the positions of the reference images may be quite accurate. However, usually, the positions that the reference images do not become too dense, that is, the reference images respectively associated with dense positions are not prepared, and thus the calculation may be performed on the premise described above. However, when the total value of the similarities exceeds 100%, distances between the positions of the reference images whose similarities exceed 0% may be calculated. As a result, when the distances are small, that is, when the positions of the reference images are too dense (unlike the above premise), the reliability may be a high value.

Also, when the position estimation is performed by calculating the similarity between the reference image and the user image using a plurality of methods, the estimation unit 13 may calculate the reliability on the basis of the position estimated according to each method. For example, the estimation unit 13 calculates, as the reliability, a value indicating a degree of variation of the position estimated according to each method. The value indicating the degree of the variation is calculated as an average or the like of distances between each position estimated according to each method and a position of the center of gravity of each position. In this case, unlike the reliability calculated using the similarity, the smaller the value is (closer to 0), the higher the reliability is.

In addition, when the position estimation is performed using the plurality of patterns of user images obtained by image processing, the estimation unit 13 may calculate the reliability on the basis of the position estimated for each pattern. For example, the estimation unit 13 calculates, as the reliability, a value indicating the degree of variation of the position estimated for each pattern. The value indicating the degree of the variation is calculated as an average or the like of distances between each position estimated for each pattern and a position of the center of gravity of each position. In this case, unlike the reliability calculated using the similarity, the smaller the value is (closer to 0), the higher the reliability is.

Further, the estimation of position and the calculation of reliability based on the comparison between the reference image and the user image are not limited to the above methods and may be performed by any method including conventional techniques. Also, the estimation unit 13 may estimate the direction (the point of the compass) related to the user image, specifically, the direction in which the user image is captured, in the same manner as the position estimation. Also, when the reliability is calculated, the direction may be considered in the same manner as the position.

The estimation unit 13 outputs, to the update unit 14, information indicating the estimated position related to the user image and the calculated reliability, and the user image used for the estimation. In addition, the estimation unit 13 outputs information indicating the estimated position in response to reception of the user image from the user terminal 20. For example, the estimation unit 13 transmits the information indicating the estimated position to the user terminal 20 that is the transmission source of the user image. Also, an output of the information indicating the estimated position may be performed by an arbitrary method other than the above.

The estimation unit 13 may perform distortion correction on at least one of the reference image and the user image. In capturing the reference image or the user image, distortion (lens distortion, distortion aberration) may occur in images depending on properties of cameras and lenses used. The wider the angle of view of the image is, the more features that can be used to calculate the similarity increase, which improves accuracy of the position estimation. On the other hand, there is a likelihood that an accurate similarity cannot be calculated due to image distortion. For example, when the type of distortion is different, for example, the reference image has barrel distortion, and the user image has pincushion distortion, or when a degree of distortion is different even for the same type of distortion, this has an influence when the similarity is calculated. For that reason, the estimation unit 13 may perform the distortion correction on either one or both of the reference image and the user image using the existing distortion correction techniques and then perform the similarity calculation described above. This processing can improve accuracy of the position estimation.

The update unit 14 is a functional unit which updates the reference images stored in the reference image database 11 using the user images on the basis of the reliability calculated by the estimation unit 13. The update unit 14 may update the reference image on the basis of a change in reliability of the plurality of user images according to the estimated position. The update unit 14 may detect a moving object appearing in the user images and update the reference image on the basis of the detection. The update unit 14 may generate one image for updating from the plurality of user images corresponding to the estimated position and update the reference image using the generated image for updating. The update unit 14 may update the reference image using the reference image before the update as well.

Specifically, the update unit 14 updates the reference image as follows. The update unit 14 is input from the estimation unit 13 with the information indicating the estimated position of the user image and the calculated reliability, and the user image used for the estimation. The update unit 14 determines whether or not to update the reference image on the basis of the reliability indicated by the information input from the estimation unit 13.

For example, the update unit 14 determines whether or not to update the reference image based on whether or not the reliability is within a preset range. Specifically, the update unit 14 compares the reliability with a preset reference (threshold), and, when the reliability is equal to or higher than the preset reference (threshold), the update unit 14 determines that the reference image is to be updated. This is because, when the reliability of the estimated position is high, the user image used for estimating the position is considered to be appropriate as the reference image.

Alternatively, the update unit 14 may store time-series reliabilities related to the plurality of user images and determine whether or not to update the reference image based on changes between the time-series reliabilities. In this case, as described above, information indicating the time related to the user images is obtained by the acquisition unit 12. The update unit 14 performs a determination with reference to the reliability for each estimated position. For example, the update unit 14 divides an area which is a target of the position estimation into a plurality of subdivisions (for example, mesh cells) and refers to the time-series reliabilities of the estimated position included in the subdivision for each subdivision. Sizes of the mesh cells are set, for example, such that positions included in the mesh cells are close to each other within a distance of about several tens of cm to about 1 m therebetween.

Figure 2:
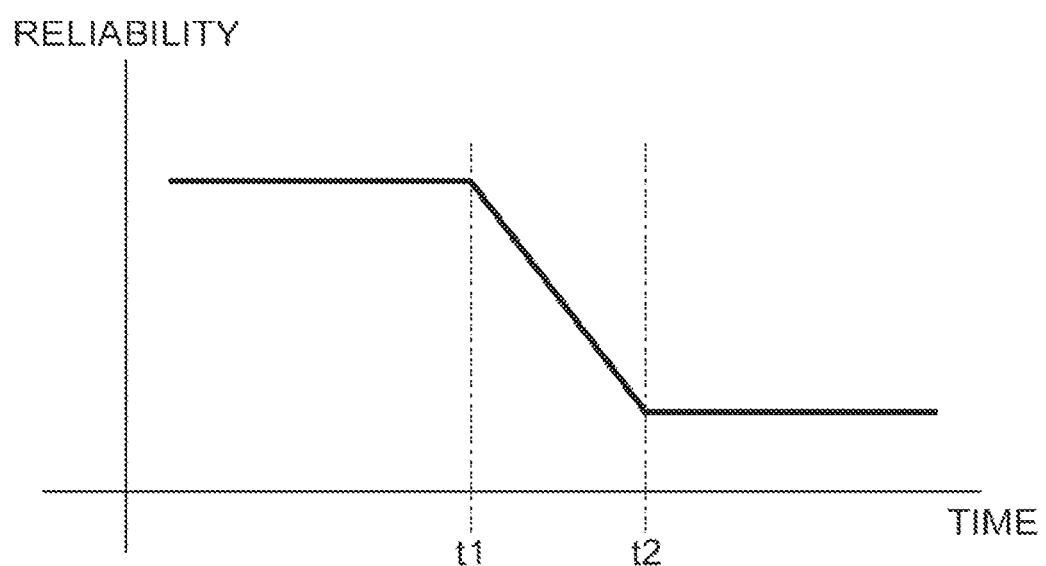
FIG. 2 is a graph showing a change in reliability in a time series.

The update unit 14 determines whether or not to update the reference image based on the reliability during a preset period, for example, a period from the time (the present time) at which the update is determined to the time dating back to a certain period of time therefrom. The update unit 14 compares a decrease in reliability during the period with a preset threshold and determines that an update of the reference image is to be performed if the decrease is equal to or greater than the threshold. FIG. 2 is a graph showing a case in which the reliability has decreased. FIG. 2 shows the graph in which the horizontal axis represents time and the vertical axis represents the reliability. In FIG. 2, the reliability decreases from time t1 to time t2, and if an amount of the decrease is equal to or more than the threshold, it is determined that the update of the reference image is to be performed.

Alternatively, the update unit 14 compares the reliability with a preset threshold (different from the threshold for the decrease), and if the reliability has changed from a state in which it exceeded the threshold to a state in which it falls below the threshold during the period, it is determined that the update of the reference image is to be performed. When the reliability decreases by a certain value or more or falls below the threshold as described above, it is considered that the scenery has changed for some reason such as construction, and thus it is determined that the update of the reference image is to be performed.

When it is determined that the update of the reference image is to be performed, the update unit 14 updates the reference image as follows. When the update unit 14 determines that the reference image is to be updated only from the reliability estimated from one user image, the update unit 14 may use the user image itself as the reference image. In this case, the position associated with the reference image is the position estimated by the estimation unit 13 for the user image. In this case, the reference image associated with the position of the same mesh cell as the position estimated by the estimation unit 13 for the user image may be deleted from the reference image database 11. That is, the update unit 14 may replace the reference image with the user image as a new reference image.

Alternatively, the update unit 14 may perform the update by setting or generating an image for updating used for updating the reference image from the user image as described below. The update unit 14 sets the latest user image of the subdivision determined to update the reference image as the image for updating. There is a likelihood that a moving object that becomes a noise for the position estimation (comparison processing between the reference image and the user image) of a person, a car (for example, an automobile), or the like may be included in the user image serving as the image for updating. Reflecting the moving object on the reference image should be avoided. For that reason, the update unit 14 may generate the image for updating in which the moving object has been removed from the user image.

Figure 3:
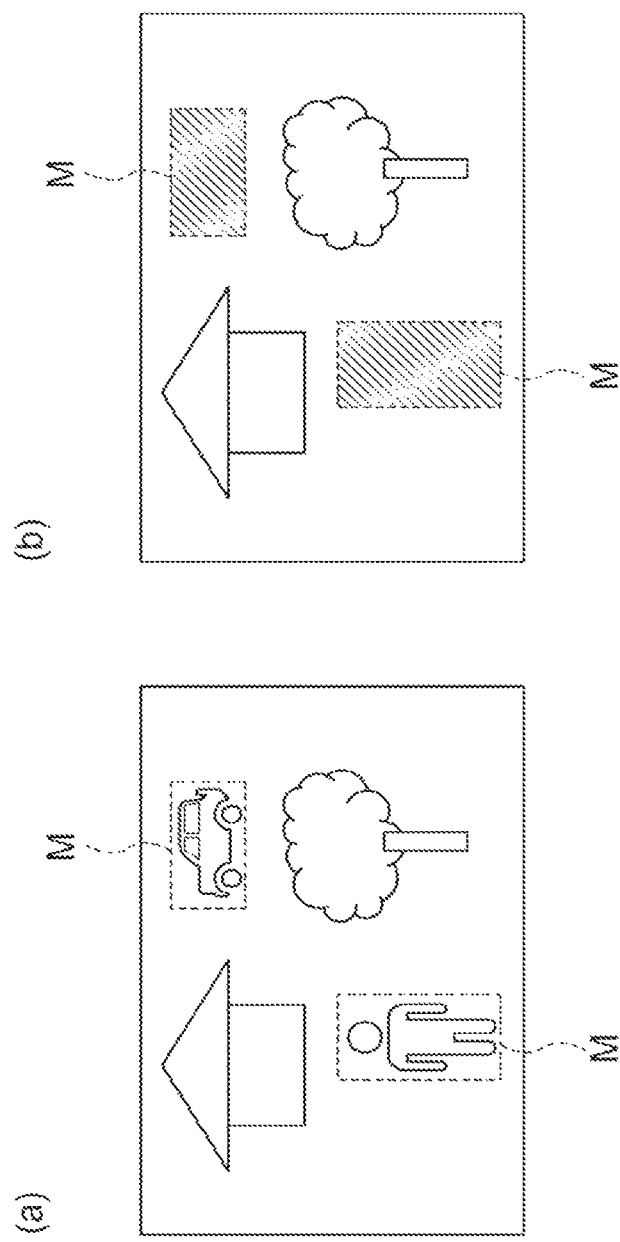
FIG. 3 is a diagram showing an example of generating an image for updating.

For example, the update unit 14 performs detection of an object using an image recognition and object detection algorithm (for example, You Only Look Once (YOLO)) and specifies an area of the moving object such as a person and a car. For example, as shown in FIG. 3(*a*), an area M in which the moving object such as a person and a car is captured in the user image is specified. The update unit 14 generates, for example, an image obtained by cutting out the specified area M as illustrated in FIG. 3(*b*) as the image for updating. The portion of the cut-out area M is treated as having no image. In other words, the portion is excluded or the like from a range from which feature amounts or the like are extracted when compared with the user image. Also, when there is no area of the moving object, the update unit 14 may use the user image as the image for updating without cutting out the area.

The update unit 14 may generate the image for updating from a plurality of user images. The plurality of user images used for generating the image for updating are the user images of which the positions estimated in the preset period described above are the same or close to each other. For example, the update unit 14 sets the plurality of user images of which the positions estimated in the above period are included in the same subdivision as the user images used for generating the image for updating.

Figure 4:
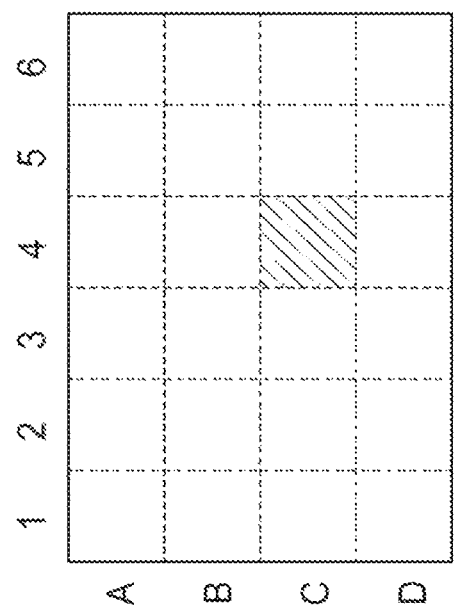
FIG. 4 is a diagram showing divided areas of an image.

The update unit 14 uses any one of the plurality of user images as a base of the image for updating to be generated. The update unit 14 sets, for example, the latest user image among the plurality of user images used for generating the image for updating as the base of the image for updating to be generated. The update unit 14 divides the user image set as the base into a plurality of areas as shown in FIG. 4. Among the areas of the user image shown in FIG. 4, the hatched area is "C4."

The update unit 14 specifies an area, in which a moving object is captured, among the areas of the base user image. Specifying the area can be performed in the same manner as described above. The update unit 14 generates the image for updating by replacing the area with an image of an area in another user image corresponding to the area. The area in another user image to be replaced is an area in which the moving object is not shown. Alternatively, the update unit 14 generates the image for updating by replacing an area, which is an area in which a scene common to that in another user image is shown and in which an object different from the scene is shown in the base user image, with the image of the area in the another user image.

Figure 5:
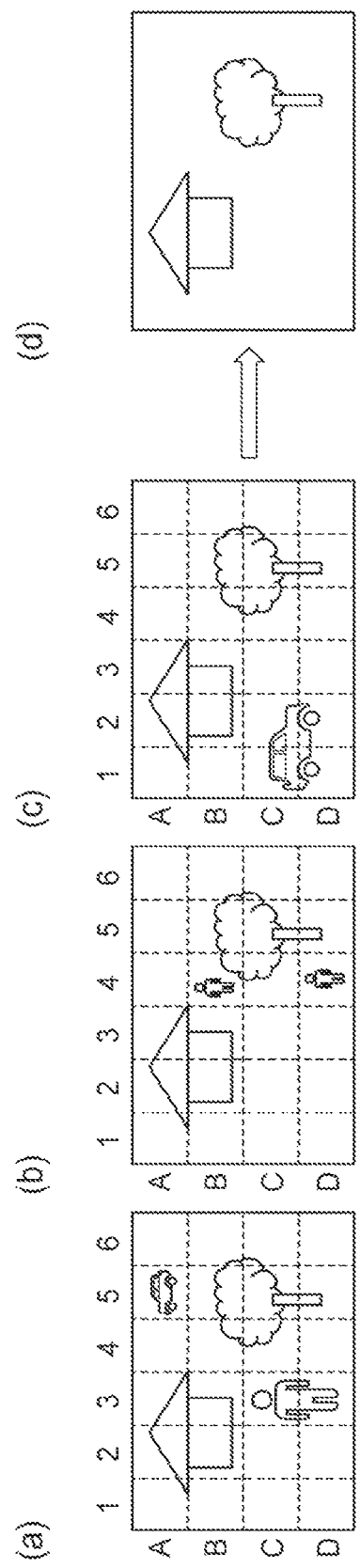
FIG. 5 is a diagram showing another example of generating an image for updating.

An example in which the image for updating is generated from three user images will be described with reference to FIG. 5. The images of FIGS. 5(*a*) to 5(*c*) are user images for generating the image for updating, and the image of FIG. 5(*a*) is a base user image. The image of FIG. 5(*d*) is an image for updating to be generated. In the area "A5" of the base user image, the car is shown, but in corresponding areas of the user images other than the base, the same scene is shown. Therefore, the area "A5" in the base user image is overwritten with the image of the corresponding area in FIG. 5(*b*) or 5(*c*). Similarly, the base user image is overwritten with another user image for other areas as well (for example, areas of "C3" and "D4").

Although it is divided into 24 areas for easy understanding in the above example, by increasing the number of divisions sufficiently and increasing the number of user images used for generating the image for updating, it is possible to increase a likelihood that the moving object can be removed. Further, it is difficult to be the plurality of user images as images in which the same place is included in the same range, that is, images at the same position. For that reason, a deviation between a position on the images and a position of a place shown in the position in the plurality of user images may be corrected using feature points of the images and contours, edges, and the like of objects shown in the images, that is, a position alignment may be performed, and then update information may be generated. The position alignment is to superimpose overlapping portions shown in the images. In the superimposition, for example, parallel movement, enlargement, and reduction of the images are performed. Here, the position alignment is performed such that the user images other than the base matches with the base user image.

The update unit 14 performs the update of the reference image using the generated image for updating. For example, the update unit 14 may replace the reference image with the image for updating as a new reference image. Alternatively, the update unit 14 may perform the update of the reference image using the reference image before the update and the generated image for updating. For example, the update unit 14 performs the update as follows.

The update unit 14 sets, as an update target, the reference image whose similarity is calculated (the similarity is a value exceeding 0%) when the position estimation is performed for the user image serving as the base of the image for updating. For example, in the case of a reference image having a similarity of 60%, an area of approximately 60% of the reference image becomes the update target, which may be influenced by a scene change resulting from a moving object and construction.

The update unit 14 performs the position alignment between images described above between the image for updating and the reference image serving as the update target. Here, the position alignment is performed such that the image for updating matches with the reference image. The update unit 14 overwrites an area of the reference image serving as the update target, which matches (overlaps) the image for updating, with the image for updating to obtain an updated reference image.

Figure 6:
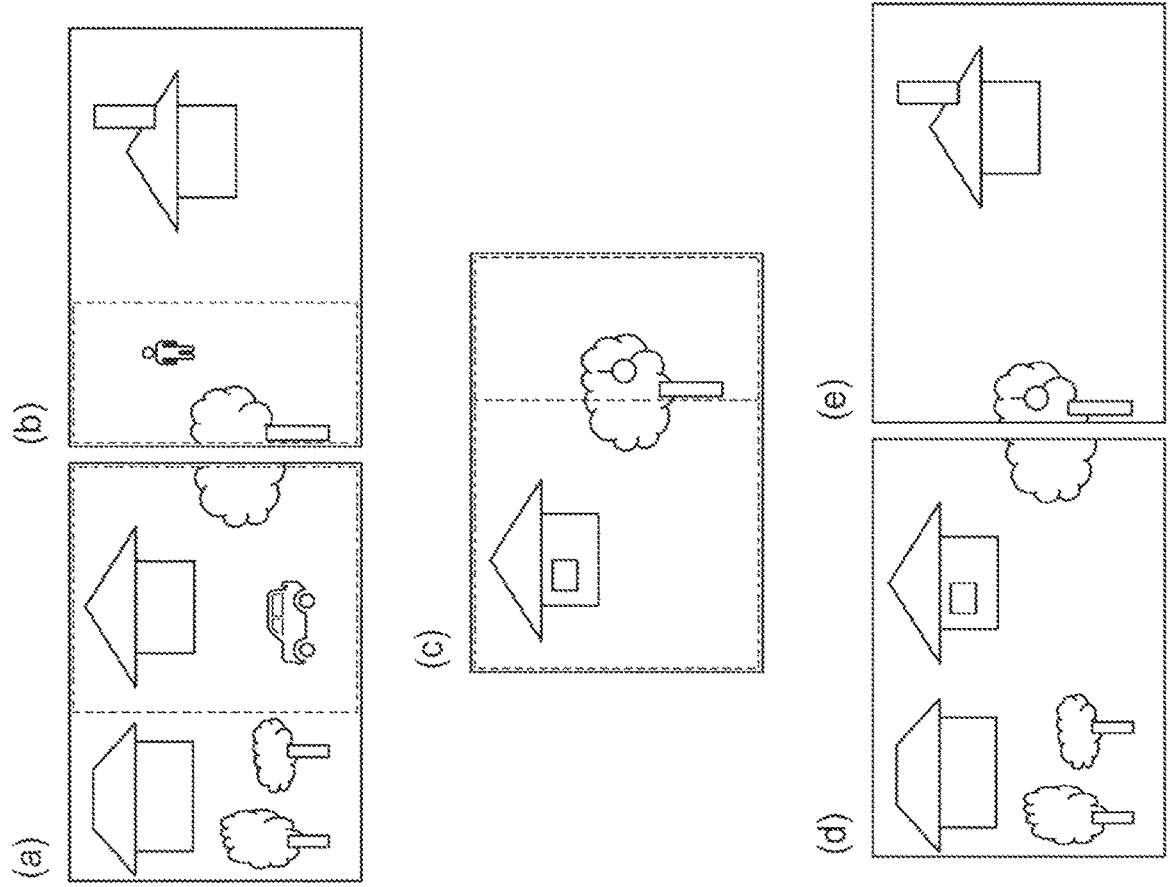
FIG. 6 is a diagram showing an example of updating a reference image.

An example of updating the image for updating will be described with reference to FIG. 6. Images of FIG. 6(*a*) and FIG. 6(*b*) are the reference images before updating. An image of FIG. 6(*c*) is the image for updating. The similarity related to the reference image of FIG. 6(*a*) is 60%, and the similarity related to the reference image of FIG. 6(b) is 40%. An area of about 60% on the right side of the reference image of FIG. 6(a) is overwritten with an area of about 60% on the left side of the image for updating to be the updated reference image of FIG. 6(d). In the updated reference image of FIG. 6(d), a car has been removed and a window has been added to a house. An area of about 40% on the left side of the reference image of FIG. 6(b) is overwritten with an area of about 40% on the right side of the image for updating to be the updated reference image of FIG. 6(e). In the updated reference image of FIG. 6(e), a tree has a fruit.

For a reference image to which the similarity is 100%, the update unit 14 may replace the reference image with the image for updating as a new reference image without performing the position alignment. Also, although it depends on a method of calculating the similarity, there are portions from which no feature points are detected, and thus, since the fact that the similarity is 100% does not necessarily mean that the images are completely the same, it is meaningful to update the reference image.

Further, when the reliability of the position estimated from the user image serving as the base of the image for updating is 100%, the estimated position is accurate, and accordingly, the image for updating may be newly added to the reference image database 11 as the reference image. In this case, the position associated with the reference image is the position estimated by the estimation unit 13 for the user image. The reference image updated as described above is used for subsequent position estimation.

Also, in updating the reference image, not only the position but also the direction may be considered. For example, a reference image associated with a direction within a certain range based on a direction estimated by the estimation unit 13 with respect to the user image may be the update target. Further, As the plurality of user images for determining a change in reliability, and the user images for generating the image for updating, ones in which a position in the same subdivision is estimated and a direction in a certain range is estimated may be used. The above are functions of the position estimation system 10 according to the present embodiment.

Figure 7:
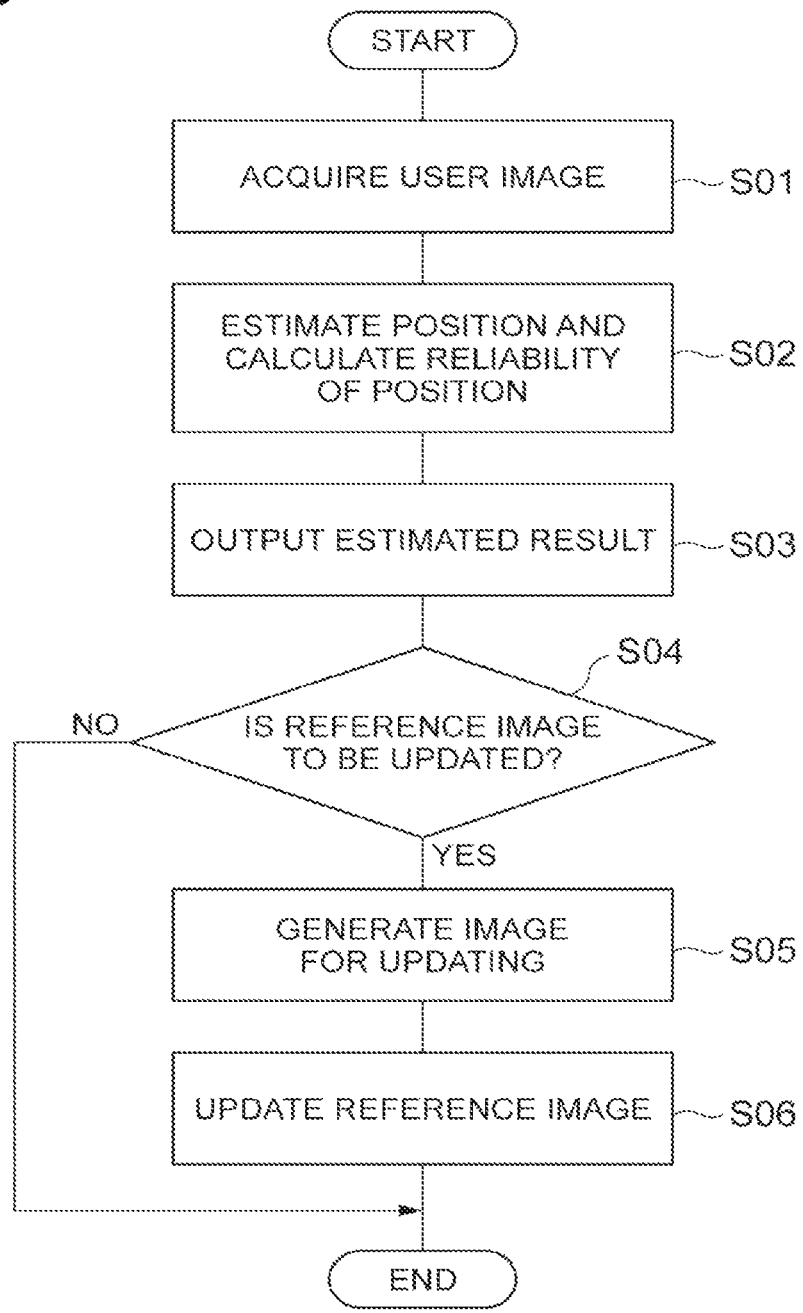
FIG. 7 is a flowchart showing processing executed by the position estimation system according to the embodiment of the present invention.

Subsequently, a process executed by the position estimation system 10 (an operation method performed by the position estimation system 10) according to the present embodiment will be described with reference to a flowchart of FIG. 7. In this process, first, the acquisition unit 12 acquires a user image (S01). Subsequently, the estimation unit 13 compares reference images stored in the reference image database 11 with the user image acquired by the acquisition unit 12, estimates a position related to the user images from information indicating positions associated with the reference images, and calculates the reliability of the estimated position (S02). Subsequently, the estimation unit 13 outputs information indicating the estimated position (S03).

Further, the update unit 14 determines whether or not to update the reference images stored in the reference image database 11 using the user image on the basis of the reliability calculated by the estimation unit 13 (S04). When it is determined that the reference image is not updated (NO in S04), the process ends. When it is determined that the reference images are to be updated (YES in S04), the update unit 14 generates an image for updating (S05). Subsequently, the update unit 14 updates the reference images stored in the reference image database 11 by using the image for updating (S06). The above is the process executed by the position estimation system 10 according to the present embodiment.

As described above, in the present embodiment, since the reference image is updated using the user image, it is not necessary to perform capturing and positioning only to register the reference image. In addition, in the present embodiment, since the reference image is updated on the basis of the reliability, appropriate updating is performed. Therefore, according to the present embodiment, it is possible to easily and appropriately perform updating of the reference image to estimate the position using the image.

Further, the reliability may be calculated on the basis of the similarity to a plurality of reference images as in the present embodiment. Alternatively, the reliability may be calculated on the basis of the position estimated according to each method such as a method of calculating the similarity. Alternatively, the reliability may be calculated on the basis of the position estimated for each pattern of a plurality of images obtained by image processing. According to these configurations, the reliability can be appropriately and reliably calculated. As a result, the reference image can be updated appropriately and reliably. However, the calculation of the reliability need not necessarily be performed using the above methods and may be performed by methods other than the above methods.

Also, as in the present embodiment, the reference image may be updated on the basis of a change in the reliability of a plurality of user images, for example, a change in a time series. According to this configuration, updating of the reference image can be appropriately determined as described above, and as a result, the reference image can be appropriately updated.

Also, as in the present embodiment, a moving object in a user image may be detected, and the reference image may be updated on the basis of the detection. According to this configuration, it is possible to prevent the reference image stored in the reference image database from being an image in which a moving object is shown.

Further, as in the present embodiment, the image for updating may be generated from a plurality of user images, and the reference image may be updated using the generated image for updating. Also, the reference image may be updated using the reference image before the update as well. According to these configurations, the reference image can be made to be appropriate as described above.

Also, in the present embodiment, an image for estimation for which the position is to be estimated is the user image captured and transmitted by the user terminal 20, but any image can be used as the image for estimation.

In the embodiment described above, an angle of view of each image has not been considered. If the angle of view of the reference image and the angle of view of the user image match each other, there is no concern. However, in the case in which the angles of view do not match each other, there is a concern that the position may be erroneously estimated. Therefore, a configuration in which the angle of view is considered as follows may be adopted.

In this case, the user terminal 20 transmits information related to the angle of view of the user image to the position estimation system 10 together with transmission of the user image. The information related to the angle of view transmitted from the user terminal 20 to the position estimation system 10 may be information indicating the angle of view itself, or may be information for calculating the angle of view. In the case of the information on the angle of view itself, the information is, for example, information on an angle of view in a longitudinal direction (vertical direction) and an angle of view in a lateral direction (horizontal direction) of the user image. The information for calculating the angle of view is, for example, information on vertical and horizontal sizes of an image sensor of a camera, and information on a focal length at the time of capturing. The position estimation system 10 receives this information from the user terminal 20 and uses it for position estimation.

In this case, the position estimation system 10 has the following configuration. The reference image database 11 may store information related to angles of view of reference images by associating them with the reference images. The reference images stored by the reference image database 11 are ones in which the angles of view of the reference images (angles of view when the reference images are captured) are known. In the case in which the angles of view of respective reference images are different from each other, the reference image database 11 may store information related to the angles of view of the reference images, specifically, information indicating the angles of view, in the state in which they are associated with respective reference images. The information stored in association with respective reference images is, for example, information on vertical angles of view and horizontal angles of view of the reference images.

The acquisition unit 12 acquires information related to the angle of view of the user image. The acquisition unit 12 may acquire information for calculating the angle of view as information related to the angle of view of the user image. Specifically, the acquisition unit 12 receives and acquires information related to the angle of view of the user image transmitted from the user terminal 20 together with the user image. The information related the angle of view of the user image is, for example, information indicating the angle of view itself as described above. Alternatively, the information related to the angle of view of the user image may be information for calculating the angle of view. The information is, for example, information on vertical and horizontal sizes of the image sensor of the camera, and the focal length at the time of capturing as described above. The acquisition unit 12 outputs the acquired information to the estimation unit 13.

The estimation unit 13 enlarges or reduces at least one of the reference images and the user image on the basis of the information related to the angle of view of the user image acquired by the acquisition unit 12. The estimation unit 13 may perform enlargement or reduction of the image on the basis of the information related to the angles of view of the reference images. The estimation unit 13 may calculate the angle of view from the information for calculating the angle of view and perform enlargement or reduction of the image on the basis of the calculated angle of view. The estimation unit 13 may perform image processing to match aspect ratios of the reference images and the user image and perform enlargement or reduction of the image.

Figure 8:
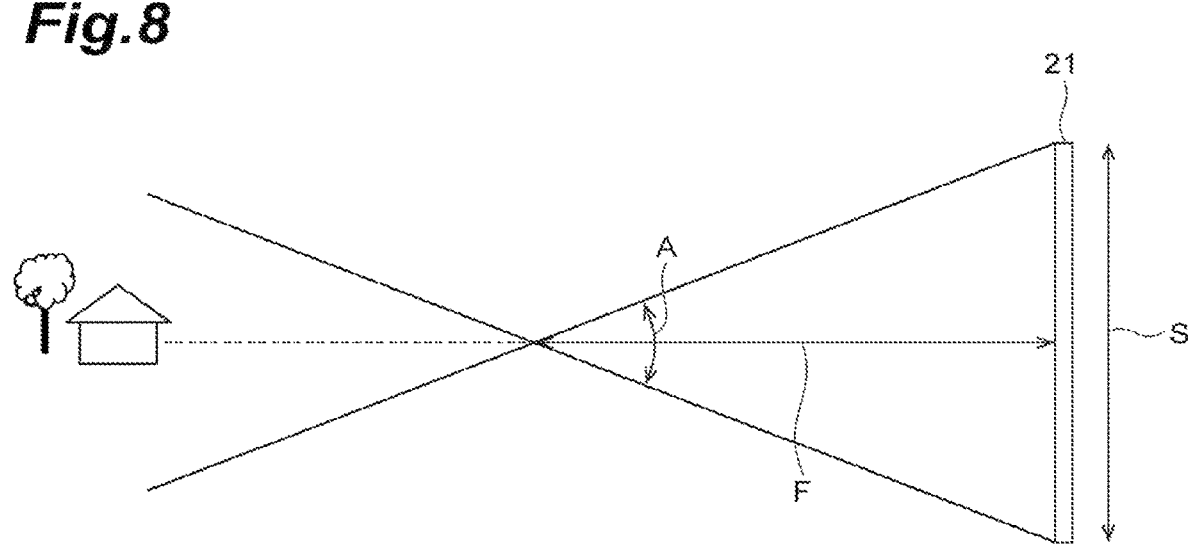
FIG. 8 is a diagram showing correlations among a size, a focal length, and an angle of view of an image sensor.

The user image and the information are input from the acquisition unit 12 to the estimation unit 13. When the information related to the angle of view of the user image input to the estimation unit 13 is the above-described information for calculating the angle of view, the estimation unit 13 calculates the angle of view as follows, for example. As shown in FIG. 8, the following correlation holds between an image sensor size (a length of the image sensor 21 shown in FIG. 8) S, a focal length F, and an angle of view A.

Image sensor size $S/(2 \times \text{focal length } F) = \tan(\text{angle of view } A/2)$ Therefore, the estimation unit 13 calculates the angle of view A by the following equation using an inverse trigonometric function arctangent.

Angle of view $A = 2 \times \arctan(\text{image sensor size } S/(2 \times \text{focal length } F))$ Also, in the case of calculating the vertical angle of view, the vertical size (length) of the image sensor is used, and in the case of calculating the horizontal angle of view, the horizontal size (length) of the image sensor is used.

Also, information for calculating an angle of view and a method of calculating the angle of view other than those described above may be used. For example, information indicating a model of the camera used to capture the user image may be used as information for calculating the angle of view.

The user image acquired by the acquisition unit 12 is compared with each reference image stored in the reference image database 11 for position estimation. Before comparing the user image with the reference images, the estimation unit 13 enlarges or reduces, with one of the user image and the user image as a reference, the other image in accordance with the reference angle of view. Also, the enlargement or reduction of the images according to the angle of view is performed both in the vertical and horizontal directions of the images.

When the image whose angle of view is to be adjusted is larger than the reference angle of view, the estimation unit 13 performs cropping (clipping or cutting) of the image as the reduction of the image. When the image whose angle of view is to be adjusted is smaller than the reference angle of view, the estimation unit 13 performs uncropping (margining) of the image as the enlargement of the image.

The estimation unit 13 performs cropping or uncropping of the image with reference to the angle of view of the user image indicated by the information input from the acquisition unit 12 or the angle of view of the user image calculated as described above and the angles of view of the reference images stored in reference image database 11. Also, when the angle of view of the user image and the angles of view of the reference images are the same, the estimation unit 13 does not perform the enlargement or reduction of the images.

The cropping process that is a process of adjusting an image having an angle of view X, which satisfies the relation of the angle of view X>an angle of view Y, to the angle of view Y will be described. The estimation unit 13 calculates a ratio of a length L of an image after cropping to an original image by the following equation using a trigonometric function tangent.

Figure 9:
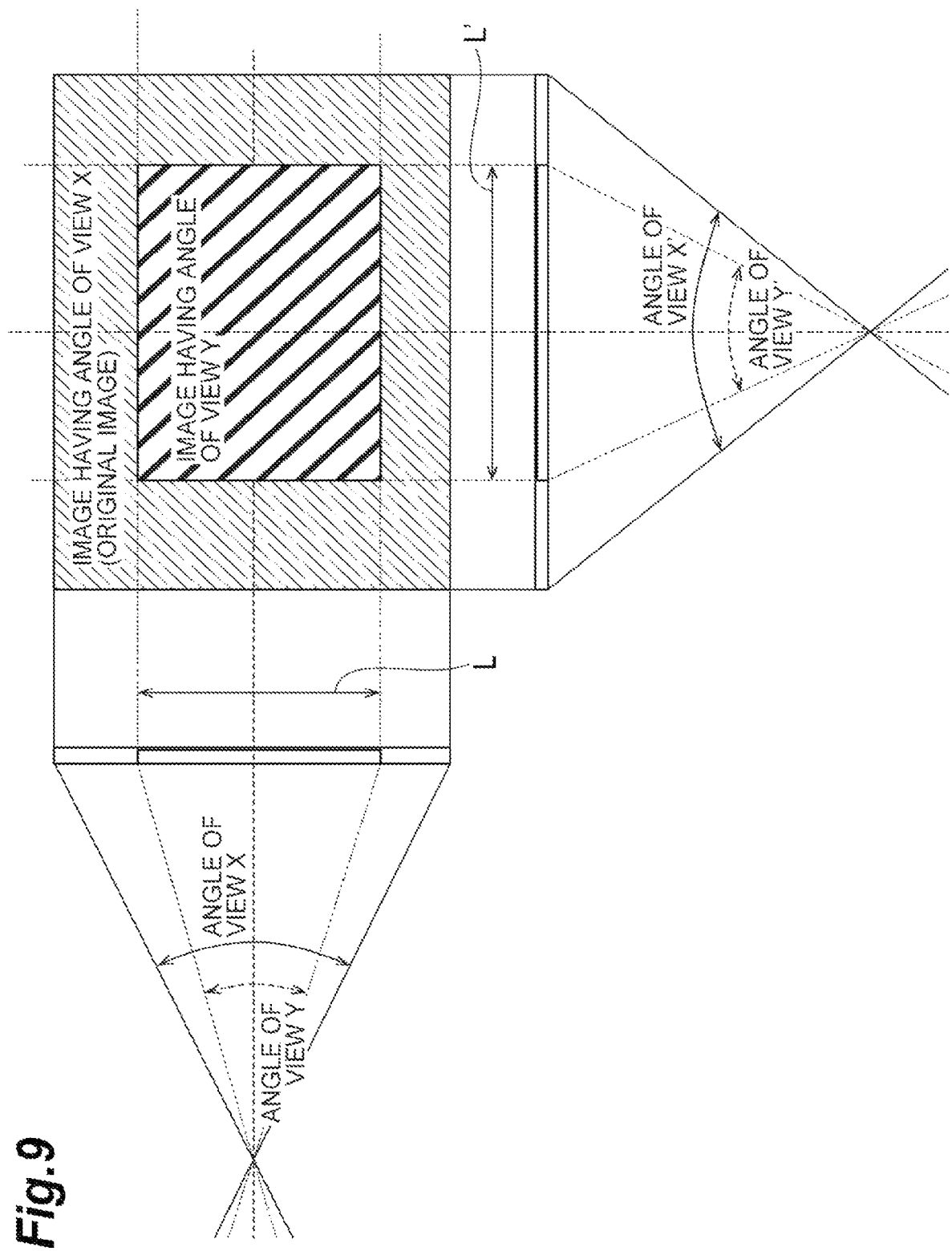
FIG. 9 is a diagram showing a crop of an image.

Ratio of length of image after cropping to original image $= \tan(Y/2)/\tan(X/2)$ Subsequently, as shown in FIG. 9, the estimation unit 13 performs a clipping process of the original image according to the ratio calculated as described above with reference to a center line of the image and generates an image having the angle of view Y. The calculation of the above ratio and the clipping process are performed in each of the vertical direction and the horizontal direction of the image. Also, in FIG. 9, the angles of view and the length of the image after cropping in the vertical direction are X, Y, and L, respectively, and the angles of view and the length of the image after cropping in the horizontal direction are X', Y' and L', respectively.

The uncropping process that is a process of adjusting an image having the angle of view X, which satisfies the relation of the angle of view X<the angle of view Y, to the angle of view Y will be described. The estimation unit 13 calculates a ratio of the length L of the image after uncropping to the original image by the following equation using a trigonometric function tangent.

Ratio of length of image after uncropping to original image=tan(Y/2)/tan(X/2)

Figure 10:
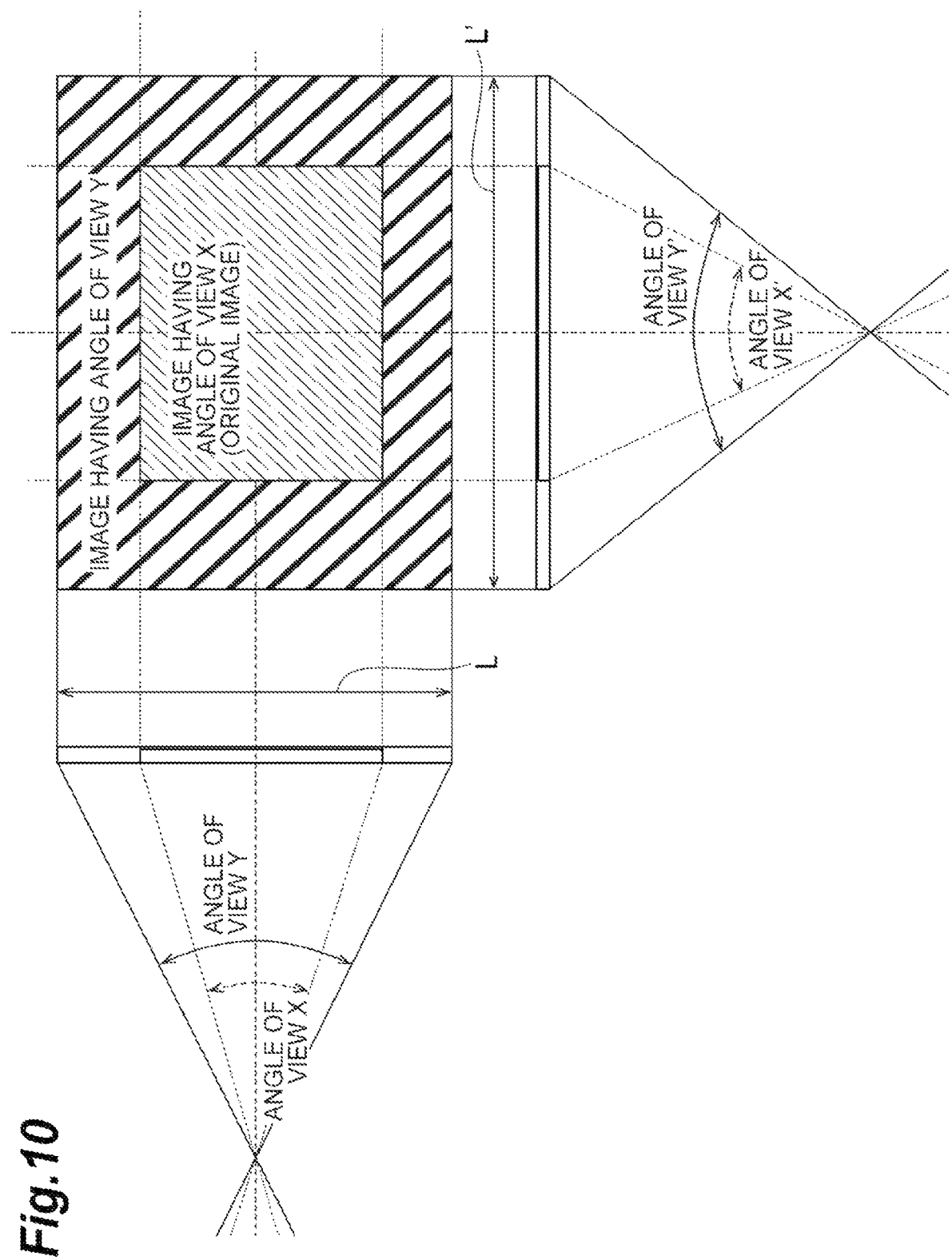
FIG. 10 is a diagram showing uncropping of an image.
Figure 11:
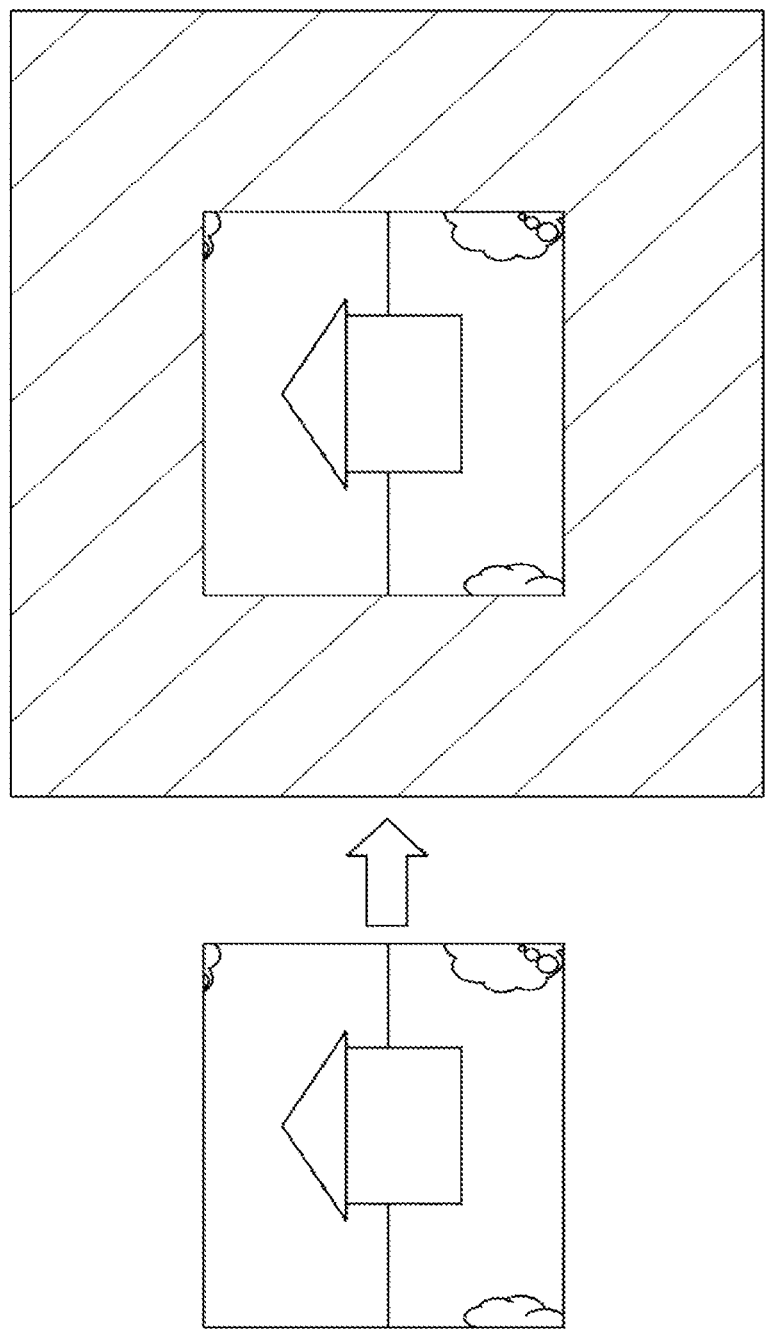
FIG. 11 is a diagram showing an example of an image before uncropping and an image after uncropping.

In addition, the above equation does not depend on magnitudes of the angles of view X and Y. That is, the above equation is the same as that in the case in which the angle of view X is larger than the angle of view Y. Subsequently, as shown in FIG. 10, the estimation unit 13 performs the uncropping process of the image according to the ratio calculated as described above with reference to the center line of the image and generates an image having the angle of view Y. Portions of the image having the angle of view Y, which are not included in the original image, that is, the portions subjected to the uncropping process are, of course, areas unaware of what is shown, and accordingly, the image having the angle of view Y is generated by performing interpolation with a preset color (for example, white or black). The calculation of the ratio and the uncropping process are performed in each of the vertical direction and the horizontal direction of the image. Also, in FIG. 10, the angles of view and the length of the image after uncropping in the vertical direction are X, Y, and L, respectively, and the angles of view and the length of the image after uncropping in the horizontal direction are X', Y', and L', respectively. FIG. 11 shows an example of the image before uncropping and the image after uncropping.

In the examples of FIGS. 9 and 10 described above, the relation of the angle of view X>the angle of view Y or the angle of view X<the angle of view Y is satisfied in both the vertical and horizontal directions of the images. However, the relation of the angle of view X>the angle of view Y may be satisfied in one of the vertical and horizontal directions, and the relation of the angle of view X<the angle of view Y may be satisfied in the other direction. In that case, the cropping may be performed in the direction satisfying the relation of the angle of view X>the angle of view Y as described above, and the uncropping may be performed in the direction satisfying the relation of the angle of view X<the angle of view Yin the same manner as described above.

The estimation unit 13 performs, for example, cropping or uncropping of the user image for each reference image (that is, for each combination of the user image and each reference image). However, cropping or uncropping of the user image may be performed only once for reference images having the same angle of view. For example, if the angles of view of the reference images stored in the reference image database 11 are all the same, the cropping or uncropping of the user image may be performed only once for all the reference images. In this case, the angle of view need not be stored in the reference image database 11 while associated with the reference images, and the estimation unit 13 may store the uniform angle of view of the reference images in advance, and perform cropping or uncropping of the user image on the basis of the angle of view. Further, the estimation unit 13 may perform cropping or uncropping of the reference images with respect to the user image.

Regarding the angle of view adjusting process between the reference image and the user image, the cropping or uncropping process may be performed in each of the vertical direction and the horizontal direction as described above. However, as another method, image processing for adjusting an aspect ratio of an image may be performed first, and then the angle of view adjusting process may be performed while maintaining the aspect ratio in either the vertical direction or the horizontal direction.

Figure 12:
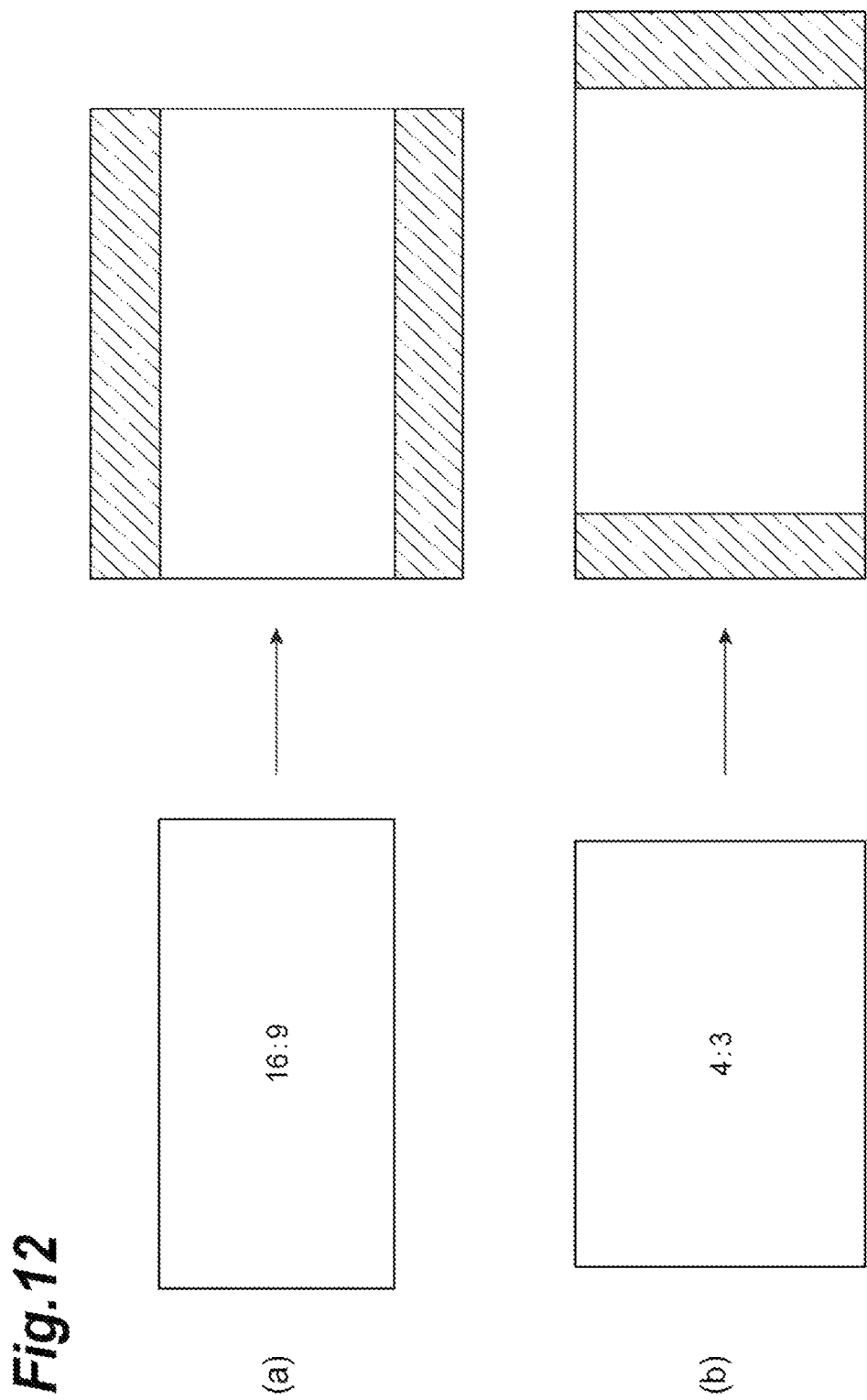
FIG. 12 is a diagram showing an example of image processing for changing an aspect ratio of an image.

In the case of reducing the aspect ratio of an image having a large aspect ratio, upper and lower sides of an original image may be uncropped with a horizontal size thereof serving as a reference. For example, when an image having an aspect ratio of 16:9 becomes 4:3 as shown in FIG. 12(*a*), upper and lower sides of the image are uncropped. In the case of increasing the aspect ratio of an image having a small aspect ratio, left and right sides of an original image may be uncropped with a vertical size thereof serving as a reference. For example, when an image having an aspect ratio of 4:3 becomes 16:9 as shown in FIG. 12(*b*), left and right sides of the image are uncropped. Also, in this case, an angle of view in a direction in which the uncropping is performed (an angle of view including an uncropped area) is calculated at a ratio according to the aspect ratio on the basis of the angle of view in a reference direction.

The above is an example in which the aspect ratio is adjusted by uncropping, and on the contrary, the aspect ratio can be adjusted by using cropping. For example, in the case shown in FIG. 12(*a*), left and right sides of the image are cut to be 4:3. However, in this case, there is a concern that an image area may be cut off to narrow an area used for comparing images, which will be described later, and thus the position estimation accuracy may be deteriorated.

It is not necessary to match image sizes of the reference images after cropping or uncropping with the user image. However, when the estimation unit 13 performs image comparison which requires that the image sizes of images to be compared are same, the estimation unit 13 performs the cropping or uncropping described above on the images and matches the image sizes of the reference images and the user image by entirely enlarging or reducing one of the images.

The estimation unit 13 compares the reference images with the user image using the enlarged or reduced image and estimates a position related to the user image from information indicating positions associated with the reference images. Specifically, the estimation unit 13 performs estimation as follows. The estimation may be performed in the same manner as in the embodiment described above.

Further, the area supplemented by uncropping is not used for calculating the similarity by excluding the range from which feature amounts or the like are extracted, or by performing supplements with a color (for example, white or black as described above) from which the feature amounts or the like are not extracted. This is because the area supplemented by the uncropping is an "unknown" area that is not shown in the original image, and thus similarity should not be found, and if a similarity is found, it must be a noise. However, the entire image generated by the uncropping, that is, the size of the image including the portion generated by the uncropping is used for calculating the similarity.

In the case in which the user image has a narrow angle of view, for example, the user uses a zoom function of the camera, a sufficient amount of features or contours may not be obtained when it is compared with the reference image to calculate the similarity. As a result, the similarity is calculated for many reference images, and the accuracy of position estimation may be deteriorated. To prevent this, when the angle of view is less than or equal to a predetermined value when the user image is captured, that is, when the angle of view of the received user image is less than or equal to a certain value, and when the similarity exceeding a certain value (for example, 0%) is calculated for a predetermined number or more of reference images at the time of calculating the similarity, it may be treated as a position estimation failure, or an error or a warning may be issued.

In the configuration described above, images are enlarged or reduced in consideration of the angle of view of the user image, and the position related to the user image is estimated. Therefore, the position estimation using the image can be performed with high accuracy. As a result, the reference images can be appropriately updated. When image processing for adjusting the angle of view is performed, the reference images may be updated using the images after the image processing.

Further, the block diagram used in the description of the embodiment described above shows blocks in functional units. These functional blocks (components) are realized by an arbitrary combination of at least one of hardware and software. Also, a method of implementing each functional block is not particularly limited. That is, each functional block may be realized using one device physically or logically combined, and each functional block may be realized by connecting two or more devices that are physically or logically separated from each other directly or indirectly (for example, using a wired or wireless connection) and using these plurality of devices. The functional block may be realized by combining one device or the plurality of devices with software.

Figure 13:
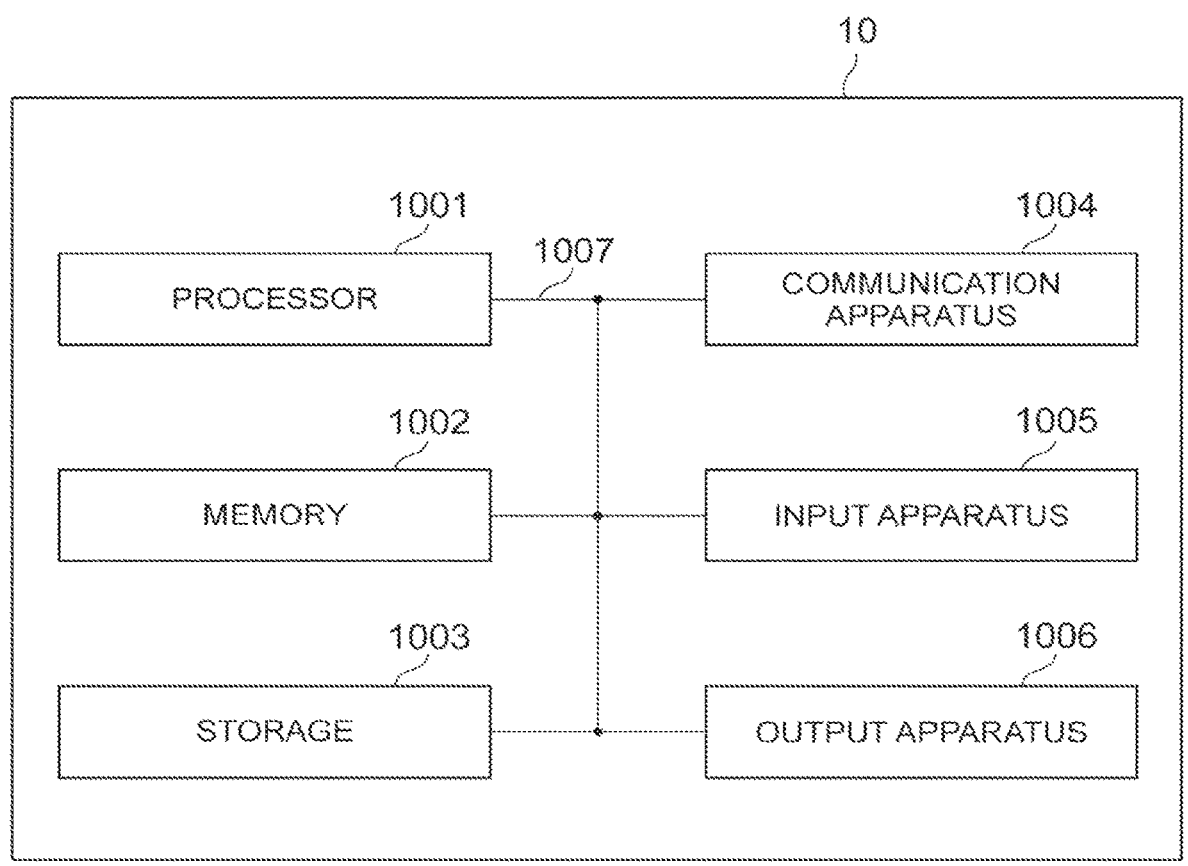
FIG. 13 is a diagram showing a hardware configuration of the position estimation system according to the embodiment of the present invention.

For example, the position estimation system 10 according to an embodiment of the present disclosure may function as a computer that performs information processing of the present disclosure. FIG. 13 is a diagram showing an example of a hardware configuration of the position estimation system 10 according to the embodiment of the present disclosure. The position estimation system 10 described above may be physically configured as a computer apparatus including a processor 1001, a memory 1002, a storage 1003, a communication apparatus 1004, an input apparatus 1005, an output apparatus 1006, a bus 1007, and the like. Also, the user terminal 20 may be configured of similar hardware.

In addition, in the following description, the term "apparatus" can be read as a circuit, a device, a unit, or the like. The hardware configuration of the position estimation system 10 may be configured to include one or more of apparatuses shown in the drawing, or may be configured to exclude some of the apparatuses.

The functions of the position estimation system 10 are realized such that predetermined software (program) is read out on hardware such as the processor 1001 and the memory 1002, the processor 1001 performs an operation and controls communication by the communication apparatus 1004, or controls at least one of reading and writing of data in the memory 1002 and the storage 1003.

The processor 1001 controls the entire computer by operating an operating system, for example. The processor 1001 may be configured by a central processing unit (CPU) including an interface with peripheral apparatuses, a control apparatus, a calculation apparatus, a register, and the like. For example, each function in the position estimation system 10 described above may be realized by the processor 1001.

In addition, the processor 1001 reads a program (program code), a software module, data, and the like from at least one of the storage 1003 and the communication apparatus 1004 to the memory 1002, and executes various processes according to these. As the program, a program that causes a computer to execute at least some of the operations described in the above embodiment is used. For example, each function of the position estimation system 10 may be realized by a control program stored in the memory 1002 and operated by the processor 1001. Although an example in which various processes described above are executed by one processor 1001 has been described, the processes may be executed simultaneously or sequentially by two or more processors 1001. The processor 1001 may be implemented by one or more chips. Also, the program may be transmitted from a network via a telecommunication line.

The memory 1002 is a computer-readable recording medium, and may include, for example, at least one of a read only memory (ROM), an erasable programmable ROM (EPROM), an electrically erasable programmable ROM (EEPROM), and a random access memory (RAM). The memory 1002 may be called a register, a cache, a main memory (main storage apparatus), or the like. The memory 1002 can store a program (program code), a software module, and the like that can be executed to perform information processing according to the embodiment of the present disclosure.

The storage 1003 is a computer-readable recording medium, and may include, for example, an optical disk such as a compact disc (CD)-ROM, a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, and a magnetic strip. The storage 1003 may be called an auxiliary storage apparatus. The storage medium included in the position estimation system 10 may be, for example, a database including at least one of the memory 1002 and the storage 1003, a server, or another appropriate medium.

The communication apparatus 1004 is hardware (transmission and reception device) for performing communication between computers via at least one of a wired network and a wireless network, and is also referred to as, for example, a network apparatus, a network controller, a network card, a communication module, or the like.

The input apparatus 1005 is an input apparatus that receives an external input (for example, a keyboard, a mouse, a microphone, a switch, a button, a sensor, and the like). The output apparatus 1006 is an output apparatus that performs output to the outside (for example, a display, a speaker, an LED lamp, and the like). Also, the input apparatus 1005 and the output apparatus 1006 may have an integrated configuration (for example, a touch panel).

Each device such as the processor 1001 and the memory 1002 is connected by the bus 1007 for communicating information. The bus 1007 may be configured using a single bus, or may be configured using a different bus for each apparatus.

Further, the position estimation system 10 may be configured by including hardware such as a microprocessor, a digital signal processor (DSP), an application specific integrated circuit (ASIC), a programmable logic device (PLD), and a field programmable gate array (FPGA), and some or all of the functional blocks may be realized by the hardware. For example, the processor 1001 is implemented using at least one of these pieces of hardware.

The processing procedure, sequence, flowchart, and the like of each aspect and embodiment described in the present disclosure may be interchanged in order as long as there is no inconsistency. For example, the method described in the present disclosure presents elements of the various steps using an exemplary order, and is not limited to the specific order presented.

The input and output information and the like may be stored in a specific place (for example, a memory) or may be managed using a management table. Information that is input and output can be overwritten, updated, or added. The output information or the like may be deleted. The input information or the like may be transmitted to another apparatus.

The determination may be made based on a value (0 or 1) represented by 1 bit, may be made by a Boolean value (true or false), or may be made by comparing numerical values (for example, comparing with a predetermined value).

Each aspect and embodiment described in the present disclosure may be used alone, may be used in combination, or may be used to be switched with execution. In addition, notification of the predetermined information (for example, notification that it is "X") is not limited to be explicitly performed, and may be performed implicitly (for example, not performing the notification of the predetermined information).

While the present disclosure has been described in detail, it will be apparent to those skilled in the art that the present disclosure is not limited to the embodiments described in the present disclosure. The present disclosure can be implemented as modified and changed aspects without departing from the spirit and scope of the present disclosure defined by the description of the claims. Therefore, the description of the present disclosure is intended for illustrative purposes, and has no restrictive meaning to the present disclosure.

Software, regardless of whether it is referred to as software, firmware, middleware, microcode, hardware description languages, or other names, should be construed broadly to indicate instructions, instruction sets, codes, code segments, program codes, programs, subprograms, software modules, applications, software applications, software packages, routines, subroutines, objects, executable files, threads of execution, procedures, functions, and the like.

In addition, software, instructions, information, and the like may be transmitted and received via a transmission medium. For example, when the software is sent from a web site, a server or other remote sources by using at least one of wired technology (coaxial cable, fiber optic cable, twisted pair, digital subscriber line (DSL), etc.) and wireless technology (infrared rays, microwaves, etc.), at least one of these wired and wireless techniques is included within the definition of the transmission medium.

In addition, information, parameters, and the like described in the present disclosure may be represented using absolute values, may be represented using a relative value from a predetermined value, or may be represented using another corresponding information.

At least one of the server (position estimation system 10) and the client (user terminal 20) may be called a transmitting apparatus, a receiving apparatus, a communication apparatus, and the like. Also, at least one of the server and the client may be an apparatus mounted on a moving object, the moving object itself, or the like. The moving object may be a vehicle (for example, a car, an airplane, or the like), may be an unmanned moving object (for example, a drone, an autonomous vehicle), or may be a robot (manned or unmanned). At least one of the server and the client includes an apparatus that does not necessarily move during a communication operation. For example, the user terminal 20 may be an Internet of Things (IoT) apparatus such as a sensor.

Further, the server in the present disclosure may be replaced with a client terminal. For example, each aspect and embodiment of the present disclosure may be applied to a configuration in which communication between a server and a client terminal is replaced with communication between a plurality of user terminals (for example, it may be referred to as device-to-device (D2D), vehicle-to-everything (V2X), etc.). In this case, the client terminal may have the function of the server described above.

Similarly, the client terminal in the present disclosure may be replaced by a server. In this case, the server may have the function of the client terminal The description "on the basis of" as used in the present disclosure does not mean "solely on the basis of" unless otherwise indicated. In other words, the description "on the basis of" means both "solely on the basis of" and "at least on the basis of."

In this disclosure, when "include," "including," and their variants are used, these terms, like the term "comprising," are intended to be inclusive. Further, the term "or" as used in the present disclosure is not intended to be an exclusive OR.

In the present disclosure, when an article is added by translation, for example, "a," "an," and "the" in English, the present disclosure may include that nouns following these articles are plural.

In the present disclosure, the term "A and B are different" may mean "A and B are different from each other." The term may mean that "A and B are different from C, respectively." Terms such as "separated," "coupled" and the like may be also interpreted similarly to "different."

REFERENCE SIGNS LIST

10 Position estimation system
11 Reference image database
12 Acquisition unit
13 Estimation unit
14 Update unit
20 User terminal
21 Image Sensor
1001 Processor
1002 Memory
1003 Storage
1004 Communication device
1005 Input device
1006 Output device
1007 Bus

The invention claimed is:

1. A position estimation system comprising circuitry configured to:
   store a reference image and information indicating a position in a state in which the reference image and the information are associated with each other;
   acquire an image for estimation which is a position estimation target;
   perform comparison of the reference image with the image for estimation, estimate the position related to the image for estimation from the information indicating the position associated with the reference image, and calculate a reliability of the estimated position; and
   update the reference image using the image for estimation on the basis of the reliability.

2. The position estimation system according to claim 1, wherein the circuitry stores a plurality of reference images, and
   performs a comparison between each of the plurality of reference images and the image for estimation, calculates a similarity between each of the reference images and the image for estimation, and calculates the reliability of the estimated position on the basis of the calculated similarity.

3. The position estimation system according to claim 1, wherein the circuitry estimates the position related to the image for estimation according to each method using a plurality of methods and calculates the reliability on the basis of the position according to each method.

4. The position estimation system according to claim 1, wherein the circuitry generates images for estimation of a plurality of patterns by performing image processing on the image for estimation, and estimates the position related to the image for estimation for each pattern and calculates the reliability on the basis of the position of each pattern.

5. The position estimation system according to claim 1,
wherein the circuitry acquires a plurality of images for estimation,
calculates the reliability for each image for estimation, and
updates the reference image on the basis of a change in reliability of the plurality of images for estimation according to the estimated position.

6. The position estimation system according to claim 1, wherein the circuitry detects a moving object appearing in the image for estimation and updates the reference image on the basis of the detection.

7. The position estimation system according to claim 1,
wherein the circuitry acquires a plurality of images for estimation, and
generates one image for updating from the plurality of images for estimation corresponding to the estimated position, and updates the reference image using the generated image for updating.

8. The position estimation system according to claim 1, wherein the circuitry updates the reference image by using the reference image before the updating as well.

9. The position estimation system according to claim 1,
wherein the circuitry acquires information related to an angle of view of the image for estimation, and
performs enlargement or reduction of at least one of the reference image and the image for estimation on the basis of the information related to the angle of view of the image for estimation, performs a comparison between the reference image and the image for estimation using the enlarged or reduced image, and estimates the position related to the image for estimation from the information indicating the position associated with the reference image.

10. The position estimation system according to claim 2, wherein the circuitry estimates the position related to the image for estimation according to each method using a plurality of methods and calculates the reliability on the basis of the position according to each method.

* * * * *